US009800495B2

(12) United States Patent
Lu et al.

(10) Patent No.: US 9,800,495 B2
(45) Date of Patent: Oct. 24, 2017

(54) FAST PROTECTION PATH ACTIVATION USING CONTROL PLANE MESSAGES

(75) Inventors: Biao Lu, Saratoga, CA (US); Jan Bialkowski, San Jose, CA (US); Edward E. Sprague, Woodside, CA (US); Parthiban Kandappan, San Jose, CA (US)

(73) Assignee: Infinera Corporation, Sunnyvale, CA (US)

( * ) Notice: Subject to any disclaimer, the term of this patent is extended or adjusted under 35 U.S.C. 154(b) by 299 days.

(21) Appl. No.: 12/571,029

(22) Filed: Sep. 30, 2009

(65) Prior Publication Data

US 2011/0075549 A1    Mar. 31, 2011

(51) Int. Cl.
*H04L 12/723* (2013.01)
*G06F 11/14* (2006.01)
*H04L 12/707* (2013.01)
*H04L 12/703* (2013.01)

(52) U.S. Cl.
CPC ........ *H04L 45/507* (2013.01); *G06F 11/1415* (2013.01); *G06F 11/1423* (2013.01); *H04L 45/22* (2013.01); *H04L 45/28* (2013.01); *H04L 45/50* (2013.01); *H04L 2212/00* (2013.01)

(58) Field of Classification Search
CPC .................................................. H04L 45/507
See application file for complete search history.

(56) References Cited

U.S. PATENT DOCUMENTS

| | | | | |
|---|---|---|---|---|
| 2002/0171886 A1* | 11/2002 | Wu et al. | ...................... | 359/110 |
| 2003/0210705 A1* | 11/2003 | Seddigh et al. | ............... | 370/419 |
| 2004/0037296 A1* | 2/2004 | Kim | .................... | H04L 12/4641 370/395.53 |
| 2004/0076151 A1* | 4/2004 | Fant et al. | ..................... | 370/389 |
| 2005/0281192 A1* | 12/2005 | Nadeau et al. | ................ | 370/217 |
| 2006/0212936 A1* | 9/2006 | Berzanskis et al. | ............ | 726/14 |
| 2007/0053359 A1* | 3/2007 | Wu | ........................... | H04J 3/14 370/392 |
| 2007/0086455 A1* | 4/2007 | Allan | ................... | H04L 12/4641 370/389 |
| 2008/0117806 A1* | 5/2008 | Xu | ............................... | 370/217 |
| 2009/0041019 A1* | 2/2009 | He et al. | ....................... | 370/392 |
| 2009/0086644 A1* | 4/2009 | Kompella et al. | ............ | 370/248 |
| 2009/0103533 A1* | 4/2009 | Li et al. | ........................ | 370/389 |

OTHER PUBLICATIONS

K. Shiomoto et al., "Use of Addresses in Generalized Multiprotocol Lable Switching (GMPLS) Networks", RFC 4990, Network Working Group, Sep. 2007.*

* cited by examiner

*Primary Examiner* — Jason Mattis
(74) *Attorney, Agent, or Firm* — Harrity & Harrity LLP; David L. Soltz

(57) ABSTRACT

A method, performed in a network that includes a group of nodes, includes identifying a path through a set of the nodes, where each node, in the set of nodes, has a data plane and a control plane; establishing a control plane tunnel, associated with the path, within the control plane of the nodes in the set of nodes; establishing a data plane tunnel, associated with the path, within the data plane of the nodes in the set of nodes, where the data plane tunnel is associated with the control plane tunnel and established through the same set of nodes; and transmitting a control message through the control plane tunnel to change a state of the data plane tunnel.

20 Claims, 14 Drawing Sheets

| INGRESS | EGRESS | DP TUNNEL ID |
|---------|--------|--------------|
| LABEL A1 | LABEL B1 | ID C1 |
| LABEL A2 | LABEL B2 | ID C2 |
| ⋮ | ⋮ | ⋮ |
| LABEL AN | LABEL BN | ID CN |

700 → with columns labeled 710, 720, 730

FAST PROTECTION PATH ACTIVATION USING CONTROL PLANE MESSAGES

BACKGROUND

As demand on the world's communication networks increases, new protocols emerge. One such protocol is called Generalized Multi-Protocol Label Switching (GMPLS). GMPLS enhances the MPLS architecture by separating the control and data planes of various networking layers. GMPLS enables a seamless interconnection and convergence of new and legacy networks by allowing end-to-end provisioning, control, and traffic engineering.

A label-switched path (LSP) may be subject to local (span), segment, and/or end-to-end recovery. Local span protection refers to the protection of the channel (and hence all the LSPs marked as required for span protection and routed over the channel) between two neighboring network nodes. Segment protection refers to the recovery of an LSP segment between two nodes (i.e., the boundary nodes of the segment). End-to-end protection refers to the protection of an entire LSP from the source node to the destination node.

SUMMARY

According to one implementation, a method, performed in a network that includes a group of nodes, is provided. The method may include identifying a path through a set of the nodes, where each node, in the set of nodes, may have a data plane and a control plane; establishing a control plane tunnel, associated with the path, within the control plane of the nodes in the set of nodes; establishing a data plane tunnel, associated with the path, within the data plane of the nodes in the set of nodes, where the data plane tunnel may be associated with the control plane tunnel and may be established through the same set of nodes; and transmitting a control message through the control plane tunnel to change a state of the data plane tunnel.

According to another implementation, a method, performed in a network that includes a group of nodes, is provided. The method may include identifying a path through a set of the nodes, where each node, in the set of nodes, may have a data plane and a control plane, and where the data plane may include a data plane switching fabric; establishing a control plane tunnel, associated with the path, within the control plane of the nodes in the set of nodes; setting up a data plane tunnel, associated with the path and within the data plane of the nodes in the set of nodes, without establishing a connection, for the data plane tunnel, through the data plane switching fabric within the nodes in the set of nodes; and activating the data plane tunnel, within the data plane of the nodes in the set of nodes, by transmitting a control message, through the control plane tunnel, to the nodes in the set of nodes, where the control message may include a label used by the nodes, in the set of nodes, to forward the control message through the control plane tunnel and to identify the data plane tunnel to activate, and where activating the data plane tunnel may include establishing a connection, for the data plane tunnel, through the data plane switching fabric within the nodes in the set of nodes.

According to a further implementation, a system may include means for identifying a path through a set of nodes in a network, where each node, in the set of nodes, may have a data plane and a control plane, and where the data plane may include a data plane switching fabric; means for establishing a control plane tunnel, associated with the path, within the control plane of the nodes in the set of nodes; means for establishing a data plane tunnel, associated with the path and within the data plane of the nodes in the set of nodes, by establishing a connection, for the data plane tunnel, through the data plane switching fabric within the nodes in the set of nodes; and means for deactivating the data plane tunnel, within the data plane of the nodes in the set of nodes, by transmitting a control message, through the control plane tunnel, to instruct the nodes in the set of nodes to change a state of the data plane tunnel, where deactivating the data plane tunnel may include removing the connection, for the data plane tunnel, through the data plane switching fabric within the nodes in the set of nodes.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements.

Implementations, described herein, may provide processes for changing a state (e.g., activated or deactivated state) of a protection path, in a network, using control plane messages. As described herein, a tunnel (e.g., a Multi-Protocol Label Switching (MPLS) tunnel) may be set up within a control plane of a node, and a corresponding tunnel (e.g., a Generalized MPLS (GMPLS) tunnel) may be set up within a data plane of the node. The term "tunnel," as used herein, is to be broadly interpreted to include a path (e.g., a label switched path, a circuit switched path, or a wavelength switched path) set up through a set of nodes.

Labels may be used for label switching control messages through the control plane tunnel. For example, the control messages may contain labels that may be used, by nodes in the network, to forward the control messages and to change the state (e.g., activated/deactivated state) of the data plane tunnel, thereby changing the state (e.g., activated/deactivated state) of the protection path. While the description below focuses on processes for changing the state of a protection path, the description may also apply to changing the state of a working path.

Thus, a control plane tunnel and a data plane tunnel may be set up through nodes on a protection path without programming the data plane switching fabric (e.g., without establishing cross-connects through the data plane switching fabric) of the nodes. When the data plane tunnel is activated, the nodes may program the data plane switching fabric (e.g., establish the cross-connects through the data plane switching fabric), thereby activating the corresponding protection path. The nodes may decouple the data plane switching fabric from the control plane functions used to activate/deactivate the protection path. The control plane functions, which control the label switching of the control messages and the programming of the data plane switching fabric, may be implemented in hardware (rather than a processor executing software) to expedite decisions made based on the control plane messages.

Based on the implementations described herein, fast (e.g., less than or equal to approximately 50 milliseconds (ms), as measured, for example, from the standpoint of the client device) restoration of service may be achieved with any number of transport payload types, such as Optical Transport Network (OTN), Gigabit Ethernet (GbE), 2×GbE, Fibre Channel (FC), 1GFC, 10GbE LAN Phy, 10GbE WAN Phy, Synchronous Transport Mode 16 (STM-16), STM-64, Optical Carrier level 48 (OC-48), and OC-192. This fast restoration of service may be used not only for end-to-end repair (as described below), but also for local repair, facility backup, and virtual private network (VPN) services.

Exemplary Network

Figure 1:
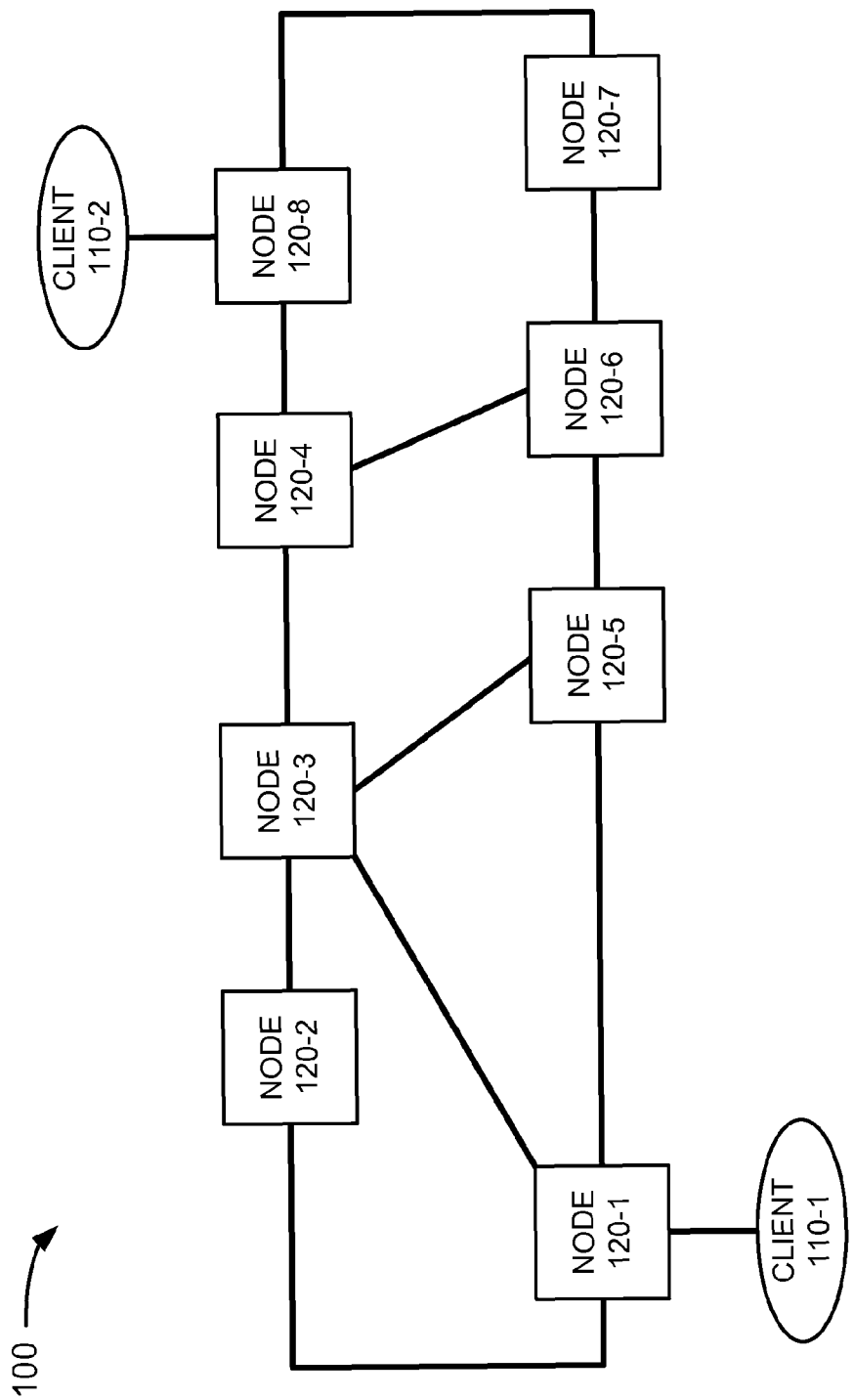
FIG. 1 is a diagram of an exemplary network in which systems and/or methods, described herein, may be implemented.

FIG. 1 is a diagram of an exemplary network 100 in which systems and/or methods, described herein, may be implemented. For example, network 100 may include clients 110-1 and 110-2 (referred to collectively as "clients 110," and individually as "client 110") and nodes 120-1, . . . , 120-8 (referred to collectively as "nodes 120," and individually as "node 120"). While FIG. 1 shows a particular number and arrangement of devices, network 100 may include additional, fewer, different, or differently arranged devices than those illustrated in FIG. 1. Also, the connections between devices may be direct or indirect connections.

Client 110 may include any type of network device, such as a router, a switch, or a central office, that may transmit and/or receive data traffic. In one implementation, client 110 may transmit a client signal (e.g., an OTN signal, a synchronous optical network (SONET) signal, a synchronous digital hierarchy (SDH) signal, an Ethernet signal, or another type of signal) to a node 120. The client signal may conform to any payload type, such as the payload types identified above.

Node 120 may include a digital switching device (e.g., an OTN device), a dense wavelength division multiplexing (DWDM) device, or a device that is a combination of a digital switching device and a DWDM device. For example, node 120 may perform digital or optical multiplexing operations (e.g., receive individual client signals on individual channels and generate a multiplexed signal, such as a multiplexed digital signal or a multi-wavelength optical signal, that may be transmitted on a single channel), amplification operations (e.g., amplify the multiplexed signal), add-drop multiplexing operations (e.g., remove one or more client signals from the multiplexed signal), and/or demultiplexing operations (e.g., receive the multiplexed signal and separate the multiplexed signal back into individual client signals that may be transmitted on individual channels). To perform these operations, node 120 may contain various components, such as a multiplexer (to perform the multiplexing operations), an amplifier (to perform the amplification operations), an add-drop multiplexer (e.g., a remotely configurable add/drop multiplexer (ROADM)) (to perform the add-drop multiplexing operations), and/or a demultiplexer (to perform the demultiplexing operations).

Nodes 120 may be connected via digital channels (e.g., time-division multiplexing (TDM) channels, such as OTN channels) or optical channels (hereinafter "channels") and may collectively form a GMPLS network. For the purpose of the discussion below, assume that node 120-1 is a source node, node 120-8 is a destination node, and nodes 120-2 through 120-7 are intermediate nodes. As used herein, the term "ingress node" may refer to the source node (i.e., a node connected to receive data traffic from a client 110) or another node 120 in network 100 that may be an end point on a protection path (described below). As used herein, the term "egress node" may refer to the destination node (i.e., a node connected to transmit data traffic to a client 110) or another node 120 in network 100 that may be an end point on a protection path (e.g., at the opposite end of the protection path than the ingress node).

Data traffic may flow from the ingress node to the egress node over a series of channels. Any two nodes 120 may connect via multiple channels. For bidirectional communication, for example, a channel (commonly referred to as a "working channel") may be dedicated for data traffic transmitted in one direction, another channel (also commonly referred to as a "working channel") may be dedicated for data traffic transmitted in the opposite direction, and yet another channel (commonly referred to as a "protection channel") may be used in case of a failure on a working channel. In one implementation, the protection channel may be used to concurrently transmit data traffic in both directions. In another implementation, one protection channel may be used to transmit data traffic in one direction, and another protection channel may be used to transmit data in the opposite direction.

The working channels between two nodes 120 (e.g., the ingress node and the egress node) may form a working path between the nodes. Similarly, the protection channels between two nodes 120 (e.g., the ingress node and the egress node) may form a protection path between the nodes. In one implementation, the protection path may traverse a different set of nodes 120 (where one or more of the nodes differ) from the working path that the protection path is configured to support. The protection path may be pre-signaled, or pre-provisioned, without establishing a connection through the switching fabric for the protection path. In one implementation, GMPLS may be used to pre-signal, or pre-provision, the protection path. Multiple protection paths may be pre-signaled, or pre-provisioned, for a particular working path.

Generally, when a failure occurs on a working path, the ingress node (or egress node or both) may be notified. The ingress node (or egress node) may select one of the protection paths and activate the selected protection path. The ingress node may notify the egress node (or vice versa) and the intermediate nodes, on the selected protection path, to activate the selected protection path.

Exemplary Components of a Node

Figure 2:
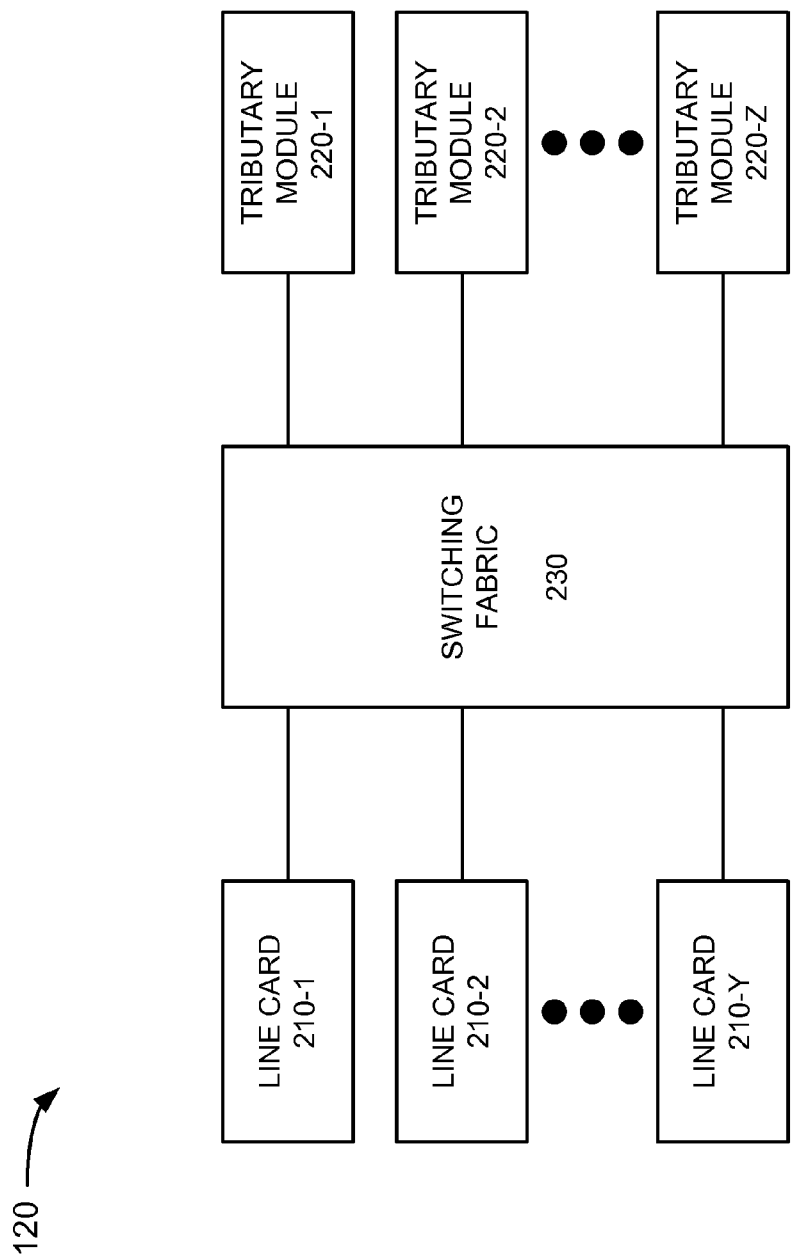
FIG. 2 is a diagram of exemplary components of a node of FIG. 1.

FIG. 2 is a diagram of exemplary components of node 120. As shown in FIG. 2, node 120 may include line cards 210-1, 210-2, . . . , 210-Y (referred to collectively as "line cards 210," and individually as "line card 210") (where Y≥0) and tributary modules 220-1, 220-2, . . . 220-Z (referred to collectively as "tributary modules 220," and individually as "tributary module 220") (where Z≥0) connected via switching fabric 230. While FIG. 2 shows a particular number and arrangement of components, node 120 may include additional, fewer, different, or differently arranged components than those illustrated in FIG. 2. For example, node 120 may include line cards 210 and no tributary modules 220, or may include tributary modules 220 and no line cards.

Line card 210 may include hardware components, or a combination of hardware and software components, that connect to a link and provide signal processing services. Line card 210 may include a receiver and/or a transmitter. The receiver may receive a digital (or optical) signal from a link, and perform various processing on the signal, such as decoding, decapsulation, etc. The transmitter may perform various processing on a signal, such as encoding, encapsulation, etc., and transmit the signal on a link.

Tributary module 220 may include hardware components, or a combination of hardware and software components, that terminate client signals. For example, tributary module 220 may support flexible adding-dropping of multiple services, such as OTN services, SONET/SDH services, GbE services, and FC services. Tributary module 220 may encapsulate client signals in a data frame. The data frame may permit all types of services to be transparent and robustly managed.

Switching fabric 230 may include a switching architecture that permits cross-connects to be established between line cards 210 and/or between line cards 210 and tributary modules 220.

Functional Diagram of a Node

Implementations described herein may facilitate set up and activation of a protection path using control messages transmitted on a control plane. For example, control messages may be used to set up tunnels associated with a protection path. Control messages may also be used to activate, or deactivate, the protection path for a failed working path. The control messages may use labels, which serve at least two functions: (1) the labels may facilitate the transportation of the control messages (via label switching) through a tunnel; and (2) the labels may facilitate the identification and activation/deactivation of protection paths.

Figure 3:
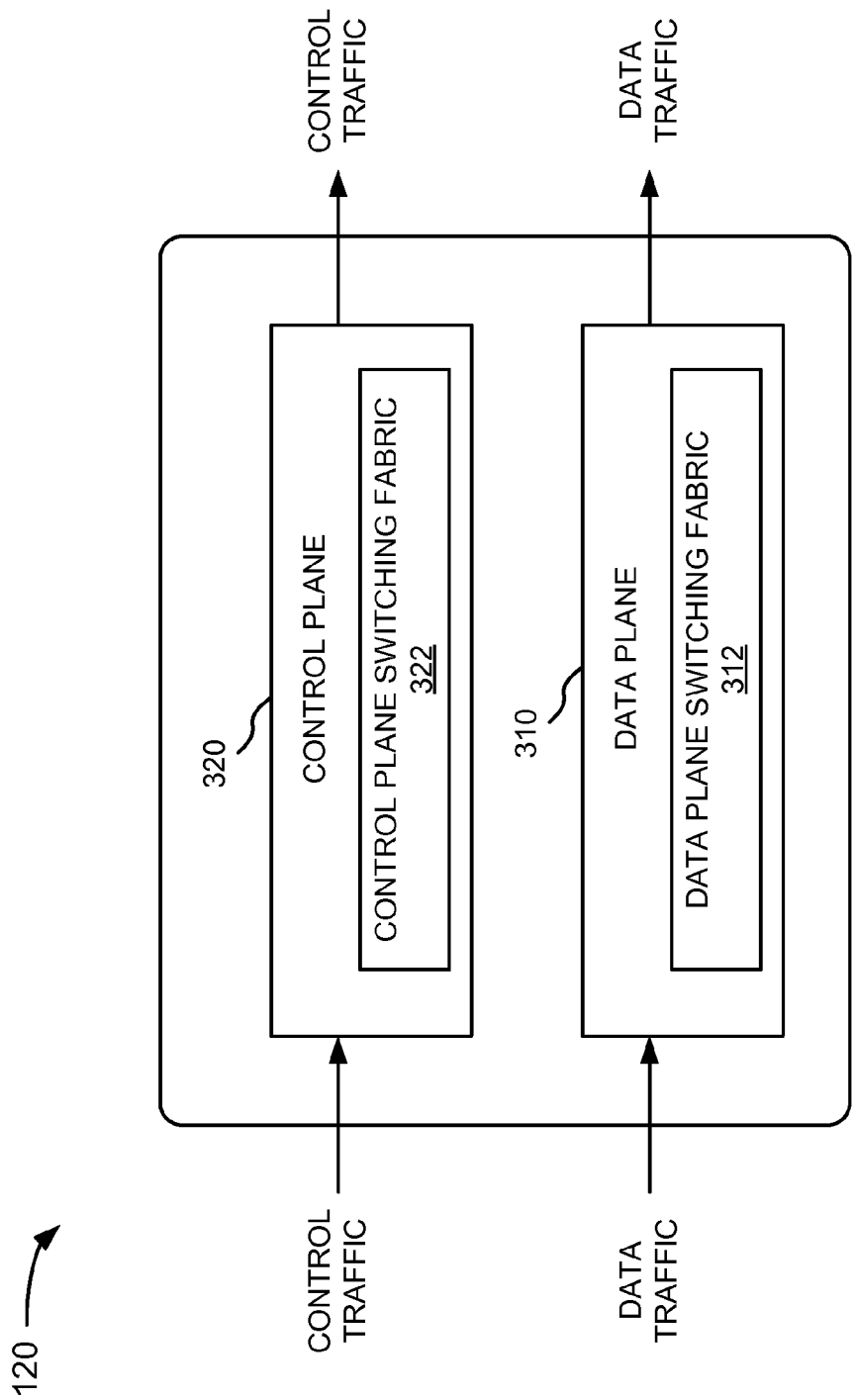
FIG. 3 is a diagram of an exemplary logical view of a node of FIG. 1.

FIG. 3 is a diagram of an exemplary logical view of node 120. As shown in FIG. 3, node 120 may include a data plane 310 and a separate control plane 320. The term "data plane," as used herein, is to be broadly interpreted to include the logical components, of a node, that are used to transport data traffic. The term "control plane," as used herein, is to be broadly interpreted to include the logical components, of a node, that are used to transport control traffic.

Data plane 310 may include hardware components used to transport data traffic through node 120. Data plane 310 may include a data plane switching fabric 312. Data plane switching fabric 312 may include a switching fabric used to transport data traffic. In one implementation, data plane switching fabric 312 corresponds to switching fabric 230, described with regard to FIG. 2.

Control plane 320 may include hardware components used to transport (e.g., label switch) control traffic through node 120 and to control the switching of data traffic, by components of data plane 310, within node 120. Control plane 320 may include control plane switching fabric 322. Control plane switching fabric 322 may include a switching fabric used to transport control traffic. In one implementation, control plane 320 may also include tables that are programmed with labels that are used by control plane 320 to control the transmission of control messages and to control the programming of data plane switching fabric 322. The tables may be implemented in hardware, such as an associative memory (e.g., a content addressable memory (CAM)).

Figure 4:
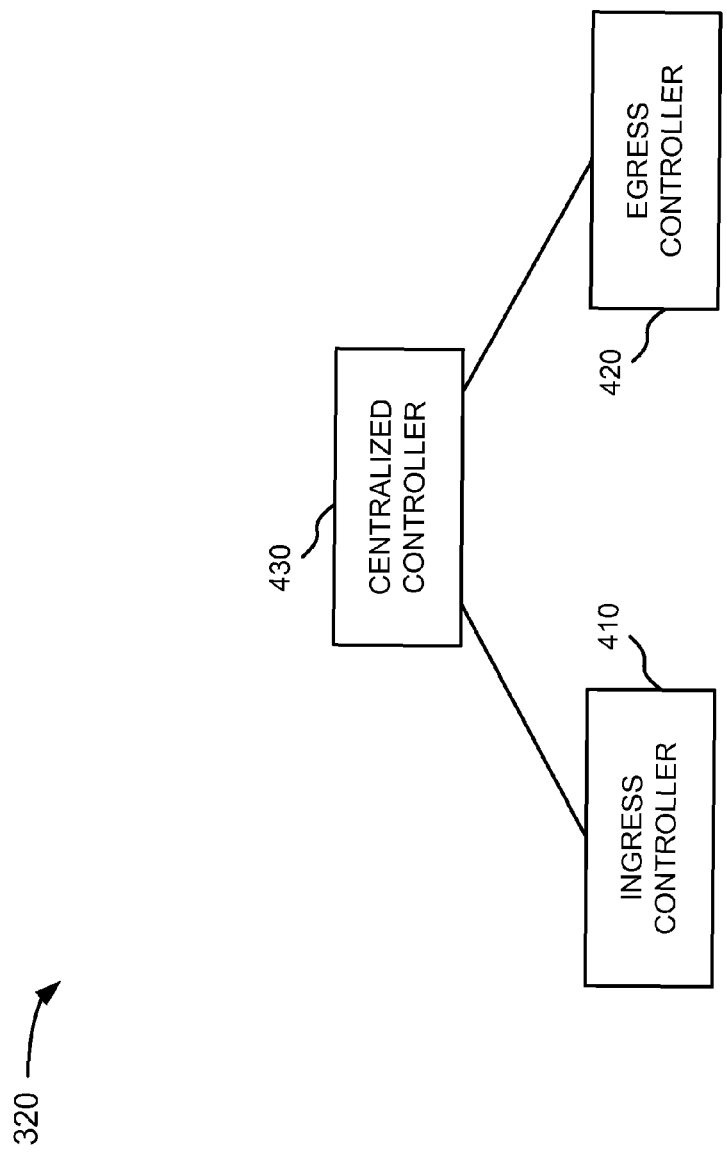
FIG. 4 is a diagram of exemplary functional components of the control plane of FIG. 3.

FIG. 4 is a diagram of exemplary functional components of control plane 320. As shown in FIG. 4, control plane 320 may include an ingress controller 410, an egress controller 420, and a centralized controller 430. In other implementations, control plane 320 may include additional, fewer, different, and/or differently arranged functional components. For example, control plane 320 may include multiple ingress controllers 410 and/or multiple egress controllers 420. Also, or alternatively, one or more (or all) of the functions of centralized controller 430 may be distributed to, or also performed by, one or more ingress controllers 410 and/or one or more egress controllers 420. Also, while not shown in FIG. 4, ingress controller 410, egress controller 430, and/or centralized controller 430 may each be associated with, or include, a switching fabric (e.g., control plane switching fabric 322) for switching control traffic.

Ingress controller 410 may include hardware, such as a field programmable gate array (FPGA) or an application specific integrated circuit (ASIC). Ingress controller 410 may receive control messages from neighboring nodes 120 and route the control messages to centralized controller 430. Ingress controller 410 may perform certain processes on control messages before sending the control messages to centralized controller 430, such as an encoding (or decoding) operation, an operation to add or remove a header (e.g., a header may be added to a control message to facilitate the routing of the control message to centralized controller 430), a label switching operation, etc. Alternatively, or additionally, ingress controller 410 may receive a notification signal (e.g., a signal notifying node 120 of a fault on a working path) and send the notification signal to centralized controller 430.

Egress controller 420 may include hardware, such as a FPGA or an ASIC. Egress controller 420 may receive control messages from centralized controller 430 and route the control messages to neighboring nodes 120. Egress controller 420 may perform certain processes on control messages received from centralized controller 430 before sending the control messages out of node 120, such as a decoding (or encoding) operation, an operation to remove or add a header (e.g., a header may be removed from a control message before sending the control message out of node 120), a label switching operation, etc.

Centralized controller 430 may include hardware, such as a FPGA or an ASIC. Centralized controller 430 may receive control messages from ingress controller 410 and may perform certain operations on the control messages. For example, centralized controller 430 may generate/analyze control messages, push/pop/swap labels, perform label lookups, set up control plane and/or data plane tunnels (described below), and/or program data plane switching fabric 312 (FIG. 3). In one implementation, centralized controller 430 may include look-up tables (e.g., implemented in hardware, such as an associative memory) that have been pre-programmed with labels associated with protection paths. Centralized controller 430 may, upon receiving a control message, identify a label included in the control message and use the label to identify, in a look-up table, another label associated with another node 120 in network 100 and/or a data plane tunnel that has been associated with the label. Centralized controller 430 may modify the control message by popping, pushing, and/or swapping one or more labels in the control message. Centralized controller 430 may send the modified control message, via a control plane tunnel, to egress controller 420 for transmission to a neighboring node 120. Centralized controller 430 may also make a local copy of the control message and use that local copy to program data plane switching fabric 312 based on a result of the table look-up. For example, centralized controller 430 may send an instruction to switching fabric 230 to connect a particular ingress link/port to a particular egress link/port.

Alternatively, or additionally, centralized controller 430 may receive notification signals from ingress controller 410. In response to receiving a notification signal, centralized controller 430 may generate a control message that includes one or more labels and/or actions. Centralized controller 430 may perform a look up in a look-up table to identify the one or more labels to include in the control message. The labels may be used by nodes 120, on a protection path, to label switch control messages and to activate or deactivate the protection path. The one or more actions, in the control message, may instruct nodes 120 to, for example, activate or deactivate the protection path. Centralized controller 430 may send the control message, via a control plane tunnel, to egress controller 420 for transmission to a neighboring node 120. Centralized controller 430 may also program data plane switching fabric 312 based on a result of the table look-up. For example, centralized controller 430 may send an instruction to switching fabric 230 to connect a particular ingress link/port to a particular egress link/port.

Exemplary Process for Setting Up and Activating a Protection Path

Figure 5:
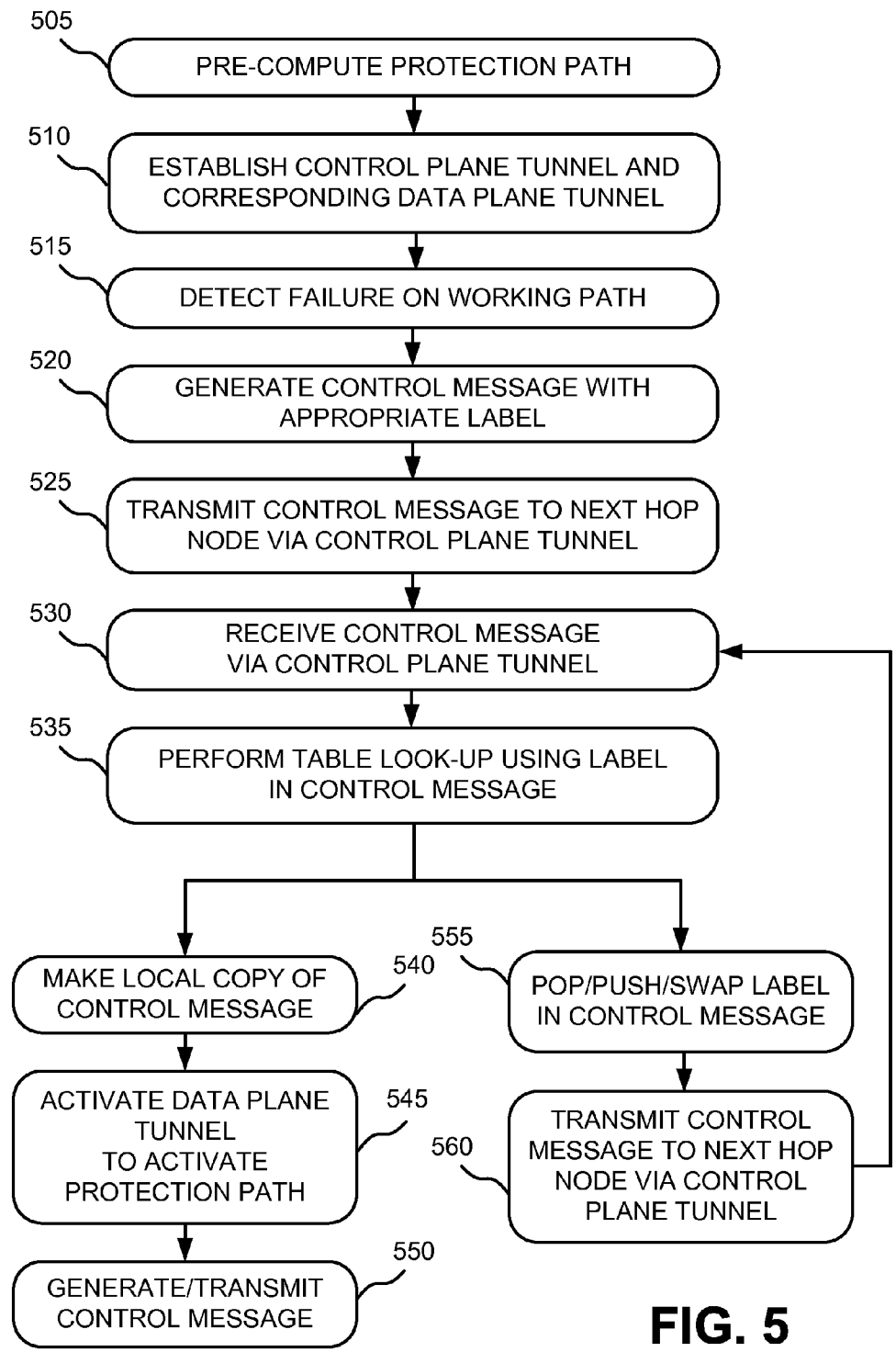
FIG. 5 is a flowchart of an exemplary process for setting up and activating a protection path.

FIG. 5 is a flowchart of an exemplary process for setting up and activating a protection path. In one implementation, one or more of the blocks, described below, may be performed by one or more nodes 120 within network 100 (e.g., one or more hardware components of nodes 120).

The process of FIG. 5 may include pre-computing a protection path (block 505). For example, one or more protection paths may be pre-assigned to one or more working paths. A protection path may be available for use when a failure occurs on a working path to which the protection path has been pre-assigned. In one implementation, the protection path may traverse a different set of nodes than the working path, which is commonly referred to as path protection. In another implementation, the protection path may traverse one or more of the same nodes as the working path, which is commonly referred to as segment protection.

The protection path may be pre-signaled (e.g., pre-provisioned), end-to-end (or node-to-node). The pre-signaling (or pre-provisioning) of the protection path may include, for example, establishing a control plane tunnel and a corresponding data plane tunnel for the protection path (block 510). The control plane tunnel may include a tunnel (e.g., a MPLS tunnel) that transports control messages used to change the state (e.g., activated or deactivated state) of the data plane tunnel. In one implementation, a separate control plane tunnel may be set up to transmit control messages in each direction (e.g., one control plane tunnel for transmitting control messages in one direction, and another control plane tunnel for transmitting control messages in the opposite direction). In another implementation, a single control plane tunnel may be set up to transmit control messages in both directions.

The data plane tunnel may include a tunnel (e.g., a GMPLS tunnel) that transports data traffic associated with the protection path. During the pre-signaling of the protection path, the data plane tunnel may be deactivated. When the data plane tunnel is deactivated, this means that data plane switching fabric 312 has not been programmed for the data plane tunnel (i.e., no cross-connects have been established through data plane switching fabric 312 for the data plane tunnel). When the data plane tunnel is activated, on the other hand, this means that data plane switching fabric 312 has been programmed for the data plane tunnel (i.e., one or more cross-connects have been established through data plane switching fabric 312 for the data plane tunnel).

In one implementation, GMPLS may be used to establish the control plane tunnel and the corresponding data plane tunnel. For example, control messages (e.g., GMPLS control messages) may be sent from node-to-node on the protection path and include information for setting up and storing control plane labels for the control plane tunnel. These control messages may also include information for setting up and storing data plane labels for the data plane tunnel. In other words, the same control messages may include information for setting up the control plane labels, and information for setting up the data plane labels.

Figures 6, 7:
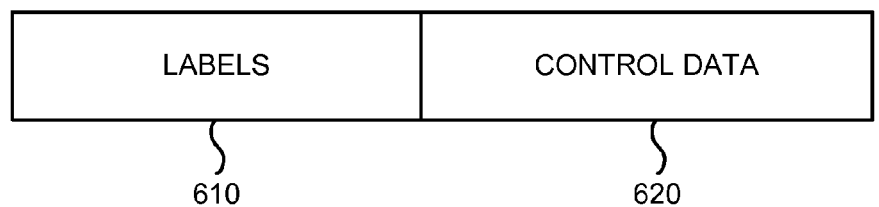
FIG. 6 is a diagram of a portion of an exemplary control message that may be used to establish tunnels within the control plane and data plane of a node.
FIG. 7 is a diagram of a logical view of a table that may be used in the control plane of a node.

FIG. 6 is a diagram of a portion of an exemplary control message 600 that may be used to establish tunnels within the control plane and data plane of a node. As shown in FIG. 6, the portion of control message 600 may include control plane information 610 and data plane information 620. Control plane information 610 may include control plane labels and other information that may facilitate the establishment of a control plane tunnel. Data plane information 620 may include data plane labels and other information that may facilitate the establishment of a data plane tunnel. In one implementation, control plane information 610 and/or data plane information 620 may be included as part of, or an extension to, a GMPLS control message.

The control plane labels and the data plane labels may be stored in one or more look-up tables. FIG. 7 is a diagram of a logical view of a table 700 that may be used by control plane 320 of a node 120. Table 700 may be implemented in hardware (e.g., an associative memory) to expedite label look-ups. As shown in FIG. 7, table 700 may include a number of entries. Each entry may include an ingress label field 710, an egress label field 720, and a data plane tunnel identifier field 730. Each of ingress label field 710 and egress label field 720 may store a label. The label in ingress label field 710 may identify a particular control plane tunnel and may be used to match a label in a received control message. The label in egress label field 720 may correspond to a next hop node and may be added to the control message (e.g., pushed onto the control message or swapped for the label, which matches the label in ingress label field 610, within the control message). Data plane tunnel identifier field 730 may store information that associates the labels of the control plane tunnel to a particular data plane tunnel. Thus, the information in data plane tunnel identifier field 730 associates a particular control plane tunnel with a particular data plane tunnel. The establishment of the control plane tunnel may involve the storing of labels in ingress label field 610 and egress label field 620 and the storing of information identifying the corresponding data plane tunnel in data plane tunnel identifier field 730 of tables 700 within nodes 120 on the protection path.

While FIG. 7 illustrates an example of a control plane table (within control plane 320), a data plane table (within data plane 310) may include similar information. For example, a data plane table may store ingress and egress labels associated with a data plane tunnel. The establishment of the data plane tunnel may involve the storing of ingress labels and egress labels within nodes 120 on the protection path.

Returning to FIG. 5, a failure on a working path may be detected (block 515). For example, a failure on a channel along the working path may occur. This failure may be detected by a node 120 connected to that channel. For example, the failure may be detected via a loss of signal at node 120, or may be detected via receipt of a particular failure signal, such as an alarm indication signal (AIS) or a remote defect indication (RDI) signal. The node 120 detecting the failure may send an appropriate signal to the ingress node. This signal may be transmitted on the working path or a path separate from the working path. The description to follow assumes that the ingress node is notified of the failure and performs certain operations to activate a protection path. In another implementation, the egress node (or even both the ingress node and the egress node) may be notified of the failure and perform one or more of these operations.

A control message, with the appropriate label, may be generated (block 520). For example, the ingress node may identify the working path on which the failure occurred. Based on the identification of the working path, the ingress node may identify an appropriate label to include in a control message. The ingress node may make this identification using a table look-up (e.g., look-up table 700 in FIG. 7) or the like. The ingress node may generate a control message that may be used to activate the protection path corresponding to the working path on which the failure occurred. The control message may, for example, be encoded as a MPLS packet with the label in the header of the MPLS packet.

Figure 8A:
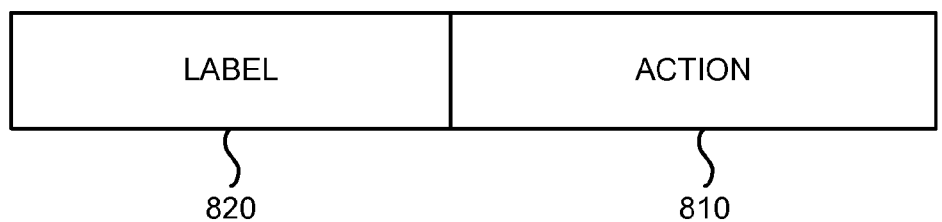
FIGS. 8A and 8B are diagrams of exemplary control messages that may be used to activate or deactivate a protection path.

FIG. 8A is a diagram of a control message 800 according to one exemplary implementation. As shown in FIG. 8A, control message 800 may include an action portion 810 and a label portion 820. Action portion 810 may be stored in a body (or payload) of control message 800, and label portion 820 may be stored in a header of control message 800. Alternatively, both action portion 810 and label portion 820 may be stored in the header or the body of control message 800, In another implementation, control message 800 may include additional, different, or differently arranged portions.

Action portion 810 may store an instruction. The instruction may correspond, for example, to an instruction to activate or deactivate a protection path. Alternatively, or additionally, action portion 810 may contain an instruction for changing a state or attribute of a protection path, which may correspond to activating or deactivating a protection path or performing some other operation with respect to a protection path. A node 120, which receives control message 800, may analyze the instruction in action portion 810 and perform the appropriate action, corresponding to the instruction. Label portion 820 may store a label. A node 120, which receives control message 800, may analyze the label and identify the appropriate data plane tunnel to activate/deactivate based on the label. In one implementation, a node 120, which receives control message 800, may pop a label from label portion 820, may push a label into label portion 820, or may swap a label, in label portion 820, with another label, and may transmit control message 800 on the control plane tunnel based on the label in control message 800.

Figure 8B:
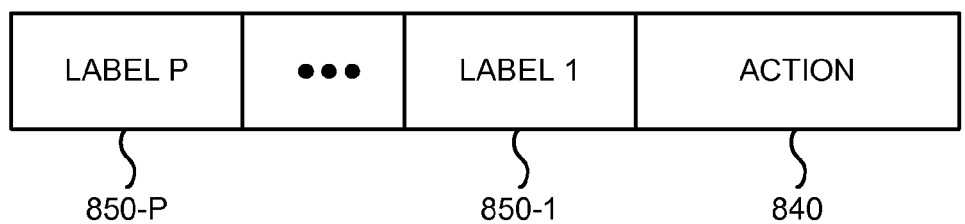

FIG. 8B is a diagram of a control message 830 according to another exemplary implementation. As shown in FIG. 8B, control message 830 may include an action portion 840 and P label portions 850-1 through 850-P (where P>1) (collectively referred to as "label portions 850" and individually as "label portion 850"). Action portion 840 may be stored in a body (or payload) of control message 830, and label portions 850 may be stored in a header of control message 830. Alternatively, both action portion 840 and label portions 850 may be stored in the header or the body of control message 830. In another implementation, control message 830 may include additional, different, or differently arranged portions.

Action portion 840 may store an instruction. The instruction may correspond, for example, to an instruction to activate or deactivate a protection path. Alternatively, or additionally, action portion 840 may contain an instruction for changing a state or attribute of a protection path, which may correspond to activating or deactivating a protection path or performing some other operation with respect to a protection path. A node 120, which receives control message 830, may analyze the instruction in action portion 840 and perform the appropriate action, corresponding to the instruction. Label portions 850 may store labels of a label stack. Each label may correspond to a different domain (e.g., a different network, such as a different optical private network (OPN), a different tunnel within the same network or different networks, etc.) within which control messages may be sent. Thus, different layers of the label stack may be used to activate a protection path for different domains that share all, or a portion, of the protection path. Because different layers of the label stack are used by different domains, there is no conflict.

A node 120, which receives control message 830, may analyze one or more labels and identify the appropriate data plane tunnel to activate/deactivate based on the label(s). In one implementation, a node 120, which receives control message 830, may pop a label from the label stack, may push a label onto the label stack, or may swap one or more labels, on the label stack, with one or more other labels, and may transmit control message 830 on the control plane tunnel based one or more labels in the label stack.

Returning to FIG. 5, the control message may be sent to the next hop node via the control plane tunnel (block 525). For example, the ingress node may transmit (e.g., label switch) the control message on the control plane tunnel to an intermediate node on the protection path. In one implementation, the control message may be transmitted similar to a point-to-multipoint (or broadcast) message rather than a point-to-point message, which is typical of a tunnel. In this case, each intermediate node along the control plane tunnel may make a copy of the control message before passing the control message along to the next hop on the control plane tunnel.

Although not shown in FIG. 5, the ingress node may make a copy of the control message and use the information in the control message to activate the data plane tunnel (e.g., by programming one or more connections, through switching fabric 312, for the data plane tunnel). In other words, the ingress node may connect a particular ingress link/port to a particular egress link/port.

The control message may be received via the control plane tunnel (block 530). For example, the next hop (e.g., intermediate) node may receive the control message from the ingress node. A table look-up may be performed using the label from the control message (block 535). For example, the next hop (e.g., intermediate) node may compare the label, from the control message, to labels stored in ingress label field 710 of look-up table 700 to identify a match. When the next hop (e.g., intermediate) node identifies a matching entry, the next hop (e.g., intermediate) node may read the label from egress label field 720 of the matching entry and/or identify the corresponding data plane tunnel from the information in data plane identifier field 730.

A local copy of the control message may be made (block 540). For example, the next hop (e.g., intermediate) node may make a copy of the control message so that the next hop (e.g., intermediate) node may act upon the contents of the control message. For example, the next hop (e.g., intermediate) node may analyze the control message and, in this exemplary implementation, identify the control message as an instruction to activate the data plane tunnel identified in the table look-up.

The data plane tunnel may be activated to activate the protection path (block 545). For example, the next hop (e.g., intermediate) node may program one or more connections through data plane switching fabric 312 to activate the data plane tunnel for the protection path. In other words, the next hop (e.g., intermediate) node may connect a particular ingress link/port to a particular egress link/port.

A control message may be generated and transmitted (block 550). For example, the next hop (e.g., intermediate) node may generate a control message with information that may be beneficial to a neighboring (upstream or downstream) node, such as channel allocation information. The next hop (e.g., intermediate) node may send (e.g., label switch) the control message on the control plane tunnel to the neighboring node.

A label, in the control message, may be popped, pushed, and/or swapped (block 555). For example, the next hop (e.g., intermediate) node may pop a label from label portion 820/850, push a label into label portion 820/850, and/or swap a label in label portion 820/850 with another label. In one implementation, the next hop (e.g., intermediate) node may pop the label from label portion 820/850 and push the label from egress label field 720, of the matching entry in table 700, into label portion 820/850. In another implementation, the next hop (e.g., intermediate) node may swap the label from label portion 820/850 for the label from egress label field 720 of the matching entry in table 700.

The control message may be sent to the next hop node via the control plane tunnel (block 560). For example, the next hop (e.g., intermediate) node may transmit (e.g., label switch) the control message on the control plane tunnel to another intermediate node (or the egress node) on the protection path. As explained above, the control message may be transmitted similar to a point-to-multipoint (or broadcast) message rather than a point-to-point message.

The process of FIG. 5 may return to block 530 where the control message may be received by the next hop (e.g., intermediate or egress) node on the protection path. The process of FIG. 5 may continue until all nodes 120, on the protection path, activate the data plane tunnel for the protection path, thereby activating the protection path.

While a series of blocks has been described with regard to FIG. 5, the order of the blocks may be modified in other implementations. Further, non-dependent blocks may be performed in parallel. For example, the control message may be forwarded on the control plane tunnel to a next hop node before, or concurrently with, activating the corresponding data plane tunnel. Alternatively, the data plane tunnel may be activated before forwarding the control message on the control plane tunnel to the next hop node.

As described above, the control plane functions relating to the transmission of control messages on the control plane tunnel and/or the activation of the corresponding data plane tunnel may be performed in hardware (e.g., a FPGA or an ASIC), thereby increasing the speed at which the protection path may be activated over a processor performing these operations by executing software. Also, the per-hop delay in message forwarding may be reduced by label switching the control messages over the control plane tunnel.

The process of FIG. 5 describes certain operations that may be performed to activate a protection path. These operations, or similar operations, may be performed to change a state of a protection path, such as activating a deactivated protection path, deactivating an activated protection path, or changing some other attribute of a protection path. Similar operations may also be performed to change a state of a working path.

Example

Figure 9:
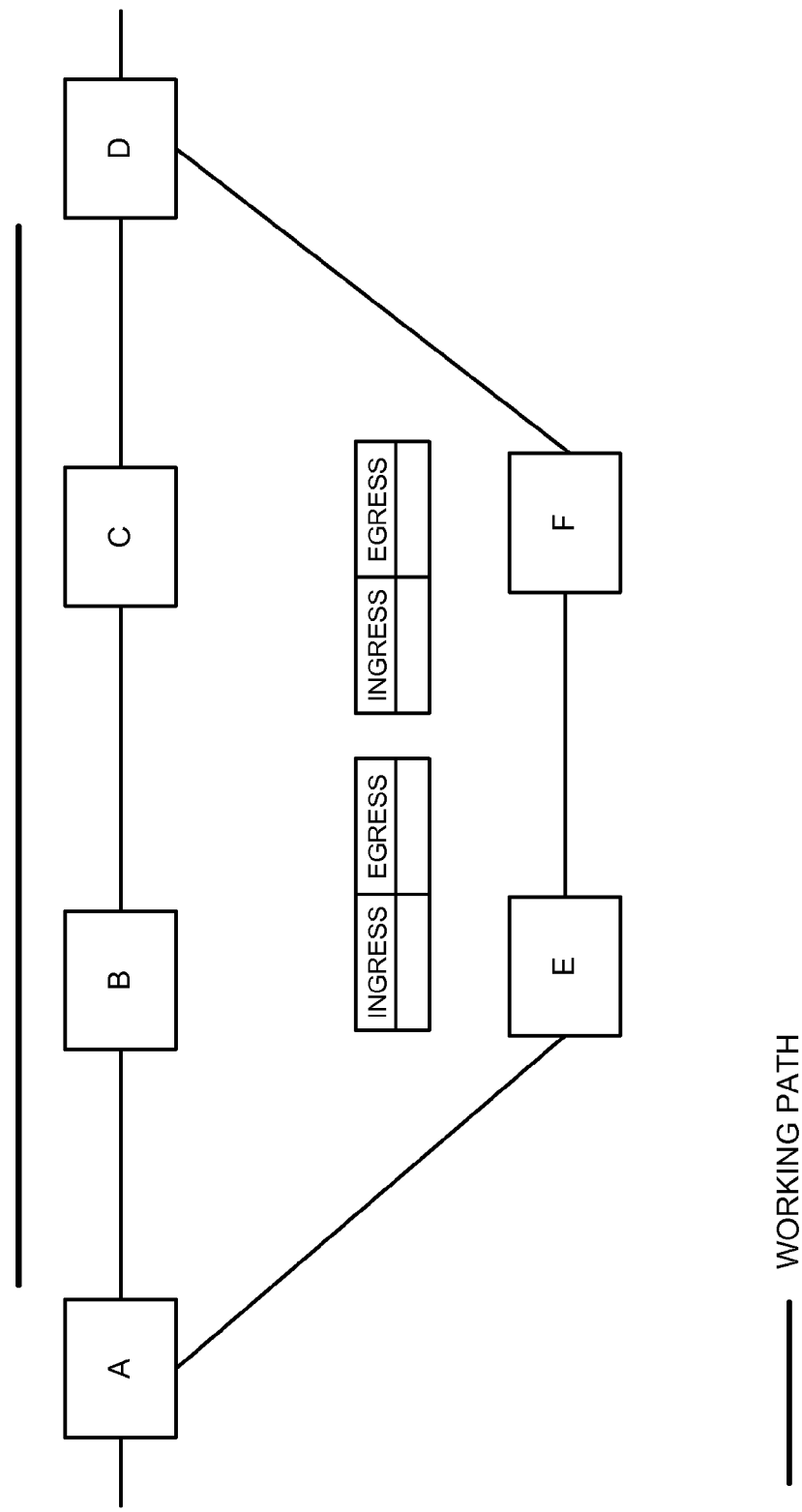
FIGS. 9-14 are diagrams illustrating exemplary processes for pre-signaling and activating a protection path.

FIGS. 9-14 are diagrams illustrating exemplary processes for pre-signaling and activating a protection path. As shown in FIG. 9, a network includes five nodes: node A, node B, node C, node D, node E, and node F. Node A is an ingress node, node D is an egress node, and nodes B, C, E, and F are intermediate nodes. A working path connects nodes A, B, C, and D. The working path may include a set of working channels (not shown) for transmitting data from ingress node A to egress node D, and a set of working channels (not shown) for transmitting data from egress node D to ingress node A. As shown in FIG. 9, no protection path has yet been pre-signaled for the working path. Thus, as shown in FIG. 9, the look-up tables of nodes E and F do not store labels yet corresponding to the protection path. Assume, however, that a protection path, which traverses nodes A, E, F, and D, has been identified for the working path.

Figure 10:
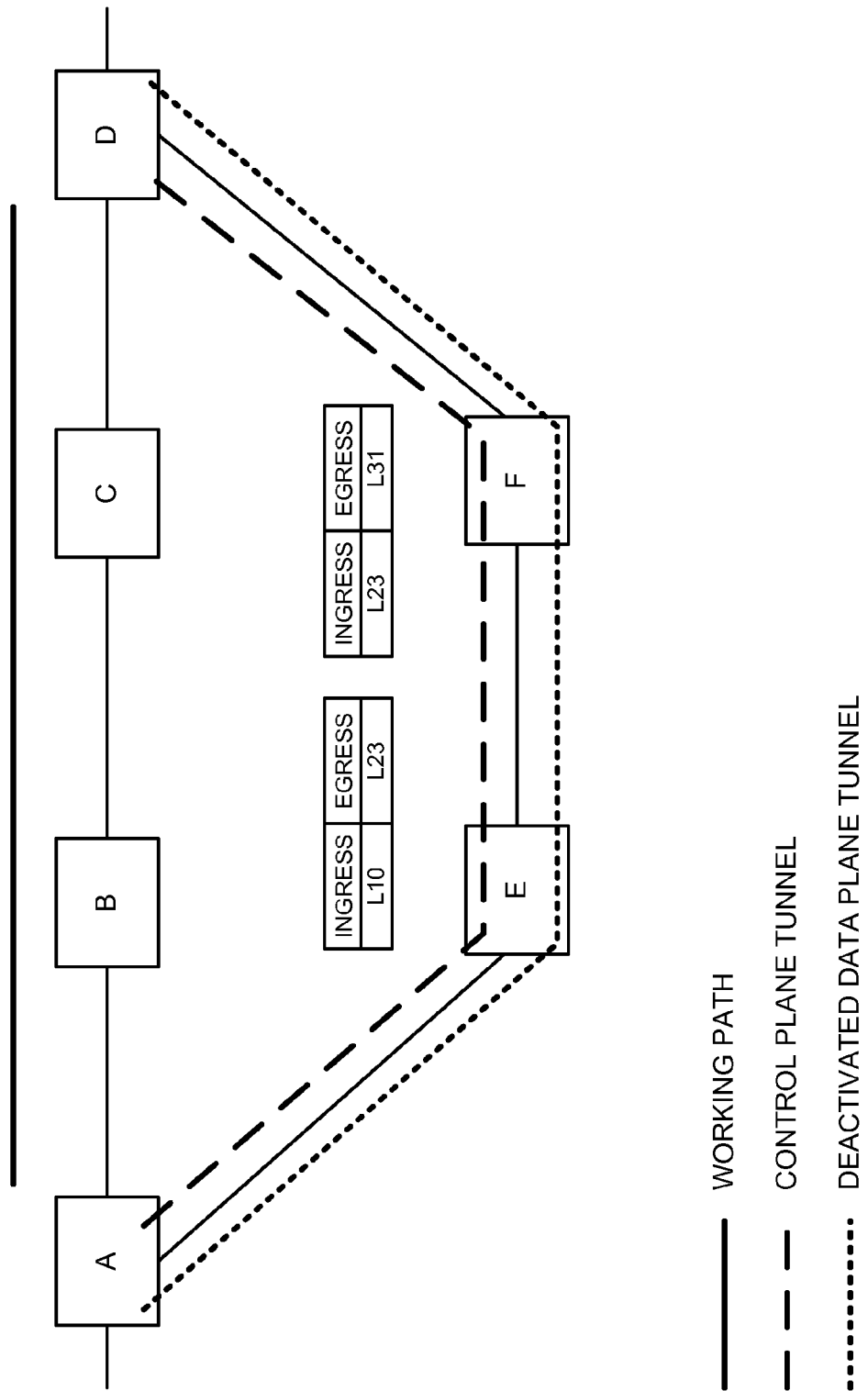

As shown in FIG. 10, a control plane tunnel and a corresponding data plane tunnel may be set up. For example, as described above, a control message may be transmitted to nodes on the protection path. The nodes, receiving the control message, may store labels associated with the control plane tunnel and the corresponding data plane tunnel in one or more look-up tables in memory. As shown in FIG. 10, the data plane tunnel may be set up, but deactivated. In other words, the nodes may establish no cross-connects, through the data plane switching fabric of the nodes, for the data plane tunnel.

Nodes E and F may store the control plane labels in their look-up tables. Nodes A and D may include similar look-up tables that also store labels, although this aspect is not shown in FIG. 10. As shown in FIG. 10, node E may include the label "L10" in the ingress label portion and the label "L23" in the egress label portion. As further shown in FIG. 10, node F may include the label "L23" in the ingress label portion and the label "L31" in the egress label portion. For simplicity, the look-up tables are not shown as including data plane identifier fields.

Figure 11:
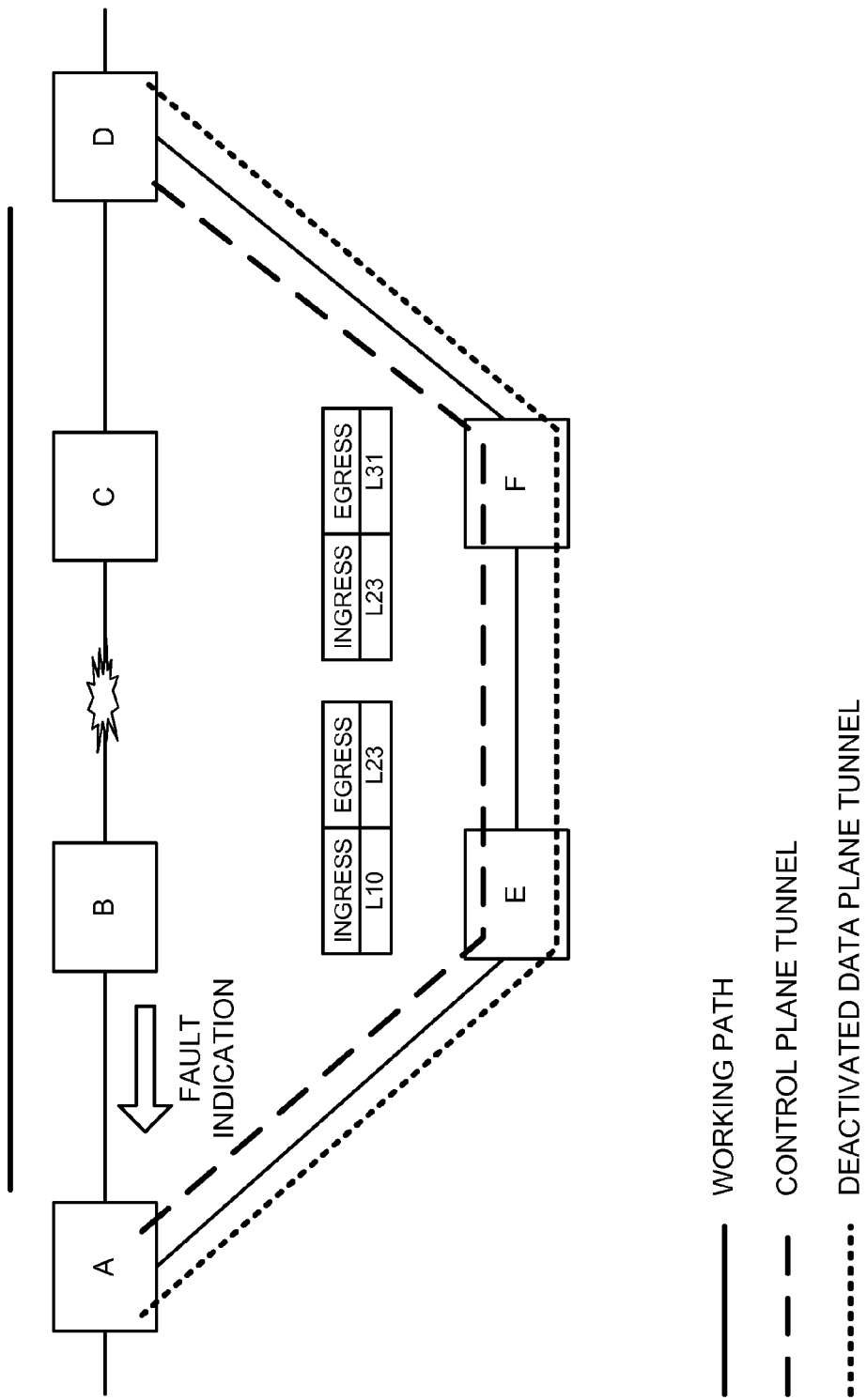

As shown in FIG. 11, assume that a failure occurs on the working path between intermediate nodes B and C. Intermediate node B may detect the failure through a loss of a received signal. Assume that intermediate node B notifies ingress node A of the failure by sending a particular signal to ingress node A via, for example, one or more of the working channels.

Figure 12:
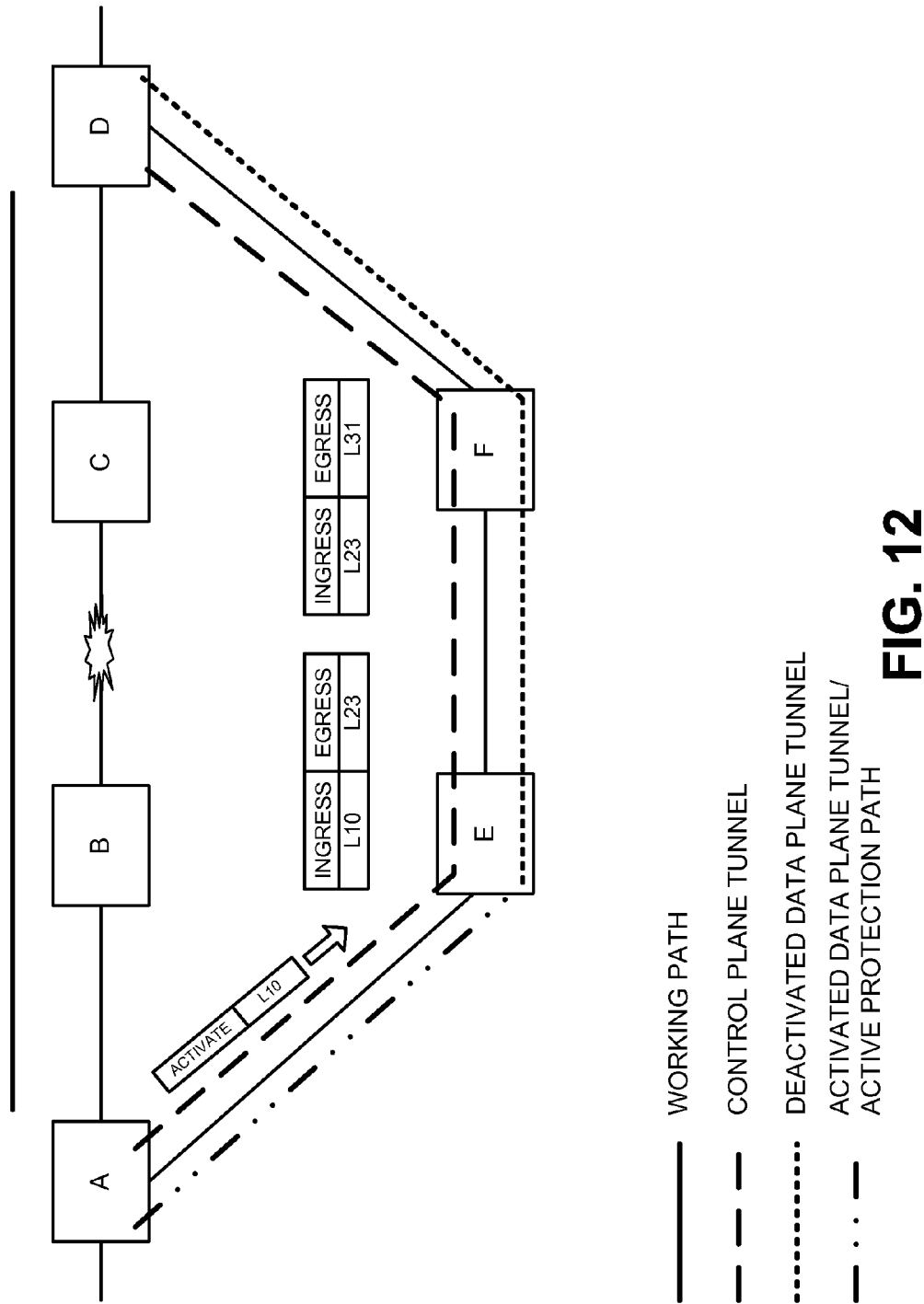

As shown in FIG. 12, ingress node A may generate a control message that includes the instruction "activate" in the action portion and the label "L10" in the label portion.

Ingress node A may transmit the control message to node E, via the control plane tunnel, to instruct node E to activate the data plane tunnel associated with the protection path. Ingress node A may make a local copy of the control message and use that local copy to activate the data plane tunnel associated with the protection path. For example, ingress node A may establish a cross-connect, through its data plane switching fabric, to connect a client signal, intended for the failed working path, to the data plane tunnel of the protection path.

Figure 13:
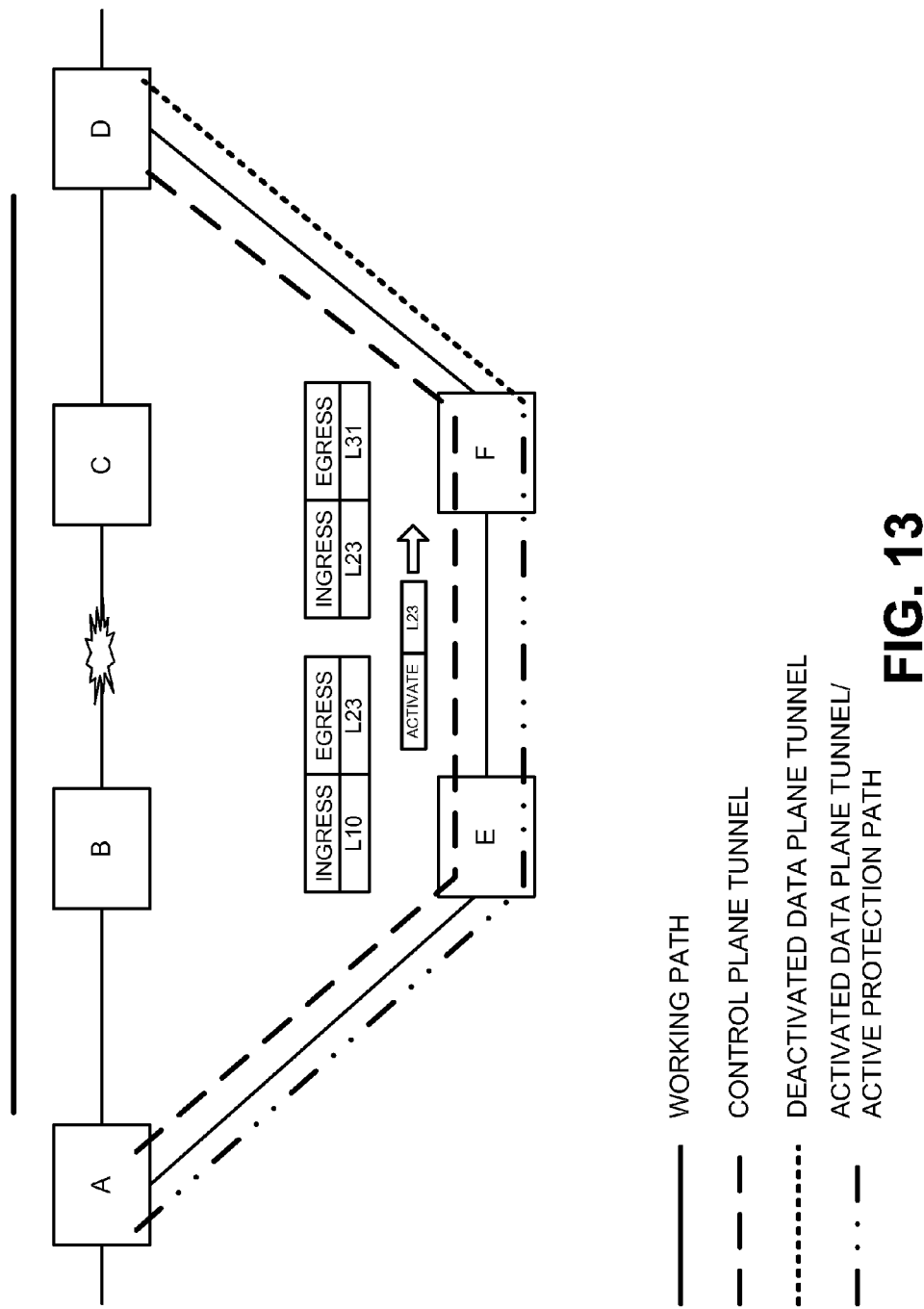

As shown in FIG. 13, node E may receive the control message from ingress node A over the control plane tunnel. Node E may perform a table look-up based on the label L10 in the control message. Node E may modify the control message to replace the label L10 in the label portion with the label "L23" from the look-up table. Node E may transmit the control message to node F, via the control plane tunnel, to instruct node F to activate the data plane tunnel associated with the protection path.

Node E may also make a local copy of the control message and use that local copy to activate the data plane tunnel associated with the protection path. For example, node E may analyze the action portion of the control message to identify the control message as an instruction to activate a data plane tunnel of a protection path. Although not shown in FIGS. 9-14, multiple data plane tunnels, associated with multiple protection paths, may be set up between two nodes of the network, such as between nodes E and F. In other words, bandwidth may be preserved for a protection path, of multiple, possible protection paths, without establishing a connection through the data plane switching fabric. Thus, multiple deactivated data plane tunnels may exist and correspond to actual, preserved bandwidth that exists on a link between two nodes.

Node E, upon receiving the control message and identifying the control message as an instruction to activate a data plane tunnel associated with a protection path, may determine which of the possible data plane tunnels to activate (e.g., which of the possible protection paths get to use that preserved bandwidth on the link). To do this, node E may compare the label L10 in the control message to the labels in its look-up table. In this case, node E may identify an entry in the look-up table that includes the label L10 in the ingress label field and information identifying a particular data plane tunnel in the data plane tunnel identifier field (not shown). Node E may activate the data plane tunnel, of the protection path, by, for example, setting up a cross-connect, through its data plane switching fabric, to connect the client signal, from ingress node A, to the data plane tunnel of the protection path.

Figure 14:
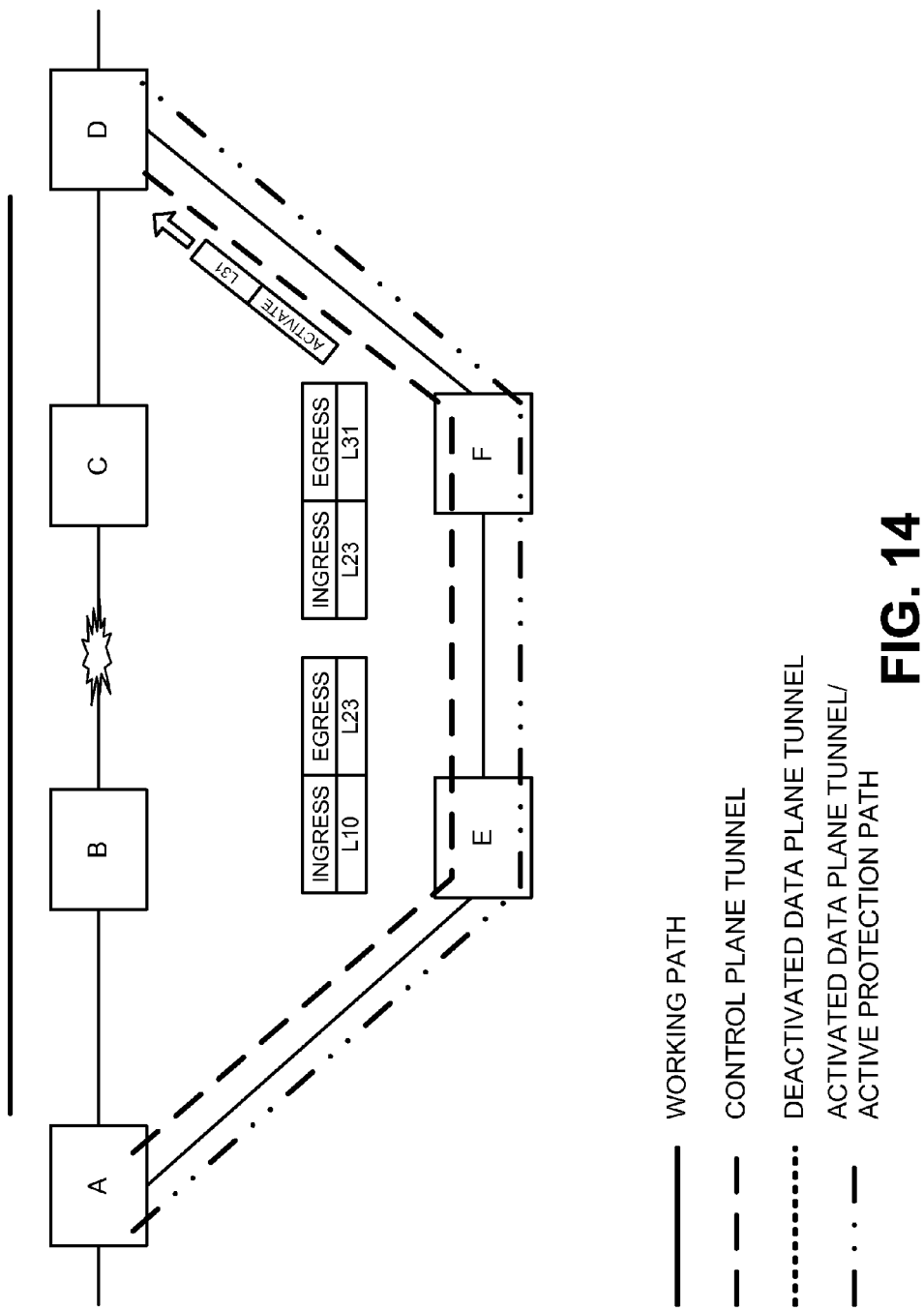

As shown in FIG. 14, node F may receive the control message from node E over the control plane tunnel. Node F may perform a table look-up based on the label L23 in the control message. Node F may modify the control message to replace the label L23 in the label portion with the label "L31" from the look-up table. Node F may transmit the control message to node D, via the control plane tunnel, to instruct node D to activate the data plane tunnel associated with the protection path.

Node F may also make a local copy of the control message and use that local copy to activate the data plane tunnel associated with the protection path. For example, node F may analyze the action portion of the control message to identify the control message as an instruction to activate a data plane tunnel of a protection path. As stated above, although not shown in FIGS. 9-14, multiple data plane tunnels, associated with multiple protection paths, may be set up between two nodes of the network, such as between nodes F and D. In other words, bandwidth may be preserved for a protection path, of multiple, possible protection paths, without establishing a connection through the data plane switching fabric. Thus, multiple deactivated data plane tunnels may exist and correspond to actual, preserved bandwidth that exists on a link between two nodes.

Node F, upon receiving the control message and identifying the control message as an instruction to activate a data plane tunnel associated with a protection path, may determine which of the possible data plane tunnels to activate (e.g., which of the possible protection paths get to use that preserved bandwidth on the link). To do this, node F may compare the label L23 in the control message to the labels in its look-up table. In this case, node F may identify an entry in the look-up table that includes the label L23 in the ingress label field and information identifying a particular data plane tunnel in the data plane tunnel identifier field (not shown). Node F may activate the data plane tunnel, of the protection path, by, for example, setting up a cross-connect through its data plane switching fabric, to connect the client signal, from node E, to the data plane tunnel of the protection path.

Node D may perform similar operations, to those operations described above, to activate the data plane tunnel associated with the protection path and/or prepare to receive the client signal on via this data plane tunnel.

While the description above identified operations that may be performed to activate a protection path, similar operations may be performed to deactivate an activated protection path. For example, control messages may be used to notify each of the nodes, on the protection path, to deactivate the activated data plane tunnel associated with the activated protection path, thereby freeing up the bandwidth preserved on the links for another protection path to use.

Also, while not shown in FIGS. 9-14, a control plane tunnel and a data plane tunnel may also be established for the working path. The state of the data plane tunnel, for the working path, may be changed by transmitting control messages on the corresponding control plane tunnel, as described above.

Protection Paths Sharing Bandwidth

As described above, multiple protection paths may be pre-assigned to the same channel or set of channels between two or more nodes 120. In one implementation, while multiple protection paths may be pre-assigned to the same channel or set of channels between two nodes 120, only one protection path can be active at any given time. As a result, it is beneficial for the working paths, to which the multiple protection paths correspond, to not have any nodes 120 or links in common. A reason for this is so that a failure on one of the working paths will not affect the operability of the other working path.

Figure 15:
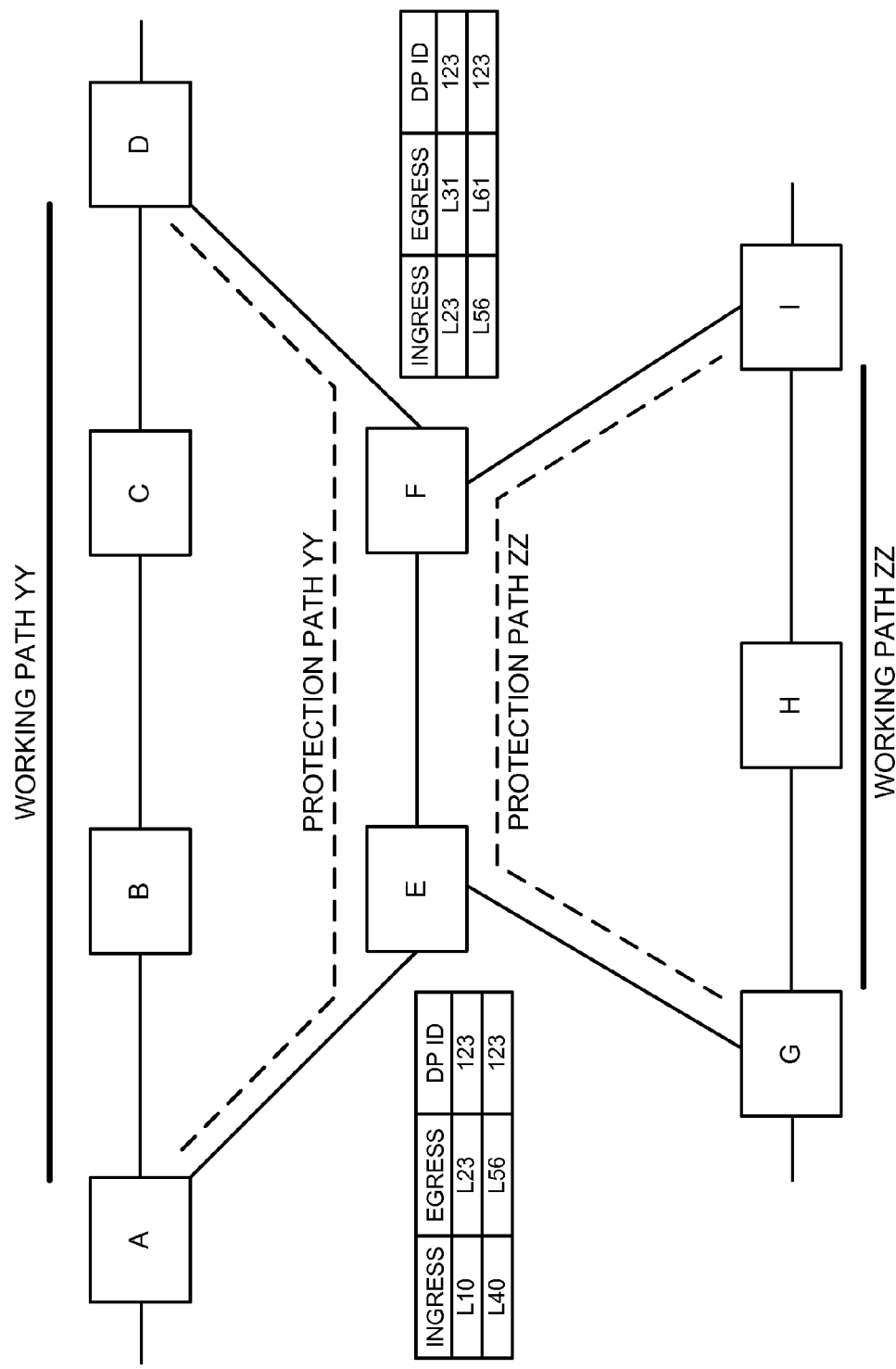
FIG. 15 is a diagram illustrating an exemplary process for bandwidth sharing by multiple protection paths.

FIG. 15 is a diagram illustrating an exemplary process for bandwidth sharing by multiple protection paths. As shown in FIG. 15, a network includes nine nodes: node A, node B, node C, node D, node E, node F, node G, node H, and node I. Nodes A and G are ingress nodes, nodes D and I are egress nodes, and nodes B, C, E, F, and H are intermediate nodes. Working path YY connects nodes A, B, C, and D. Working path ZZ connects nodes G, H, and I. Each of working paths YY/ZZ may include a set of working channels (not shown) for transmitting data from/to ingress nodes A/G to/from egress nodes D/I.

As shown in FIG. 15, protection paths have been set up for working paths YY and ZZ. For example, protection path YY has been set up for working path YY, and protection path ZZ has been set up for working path ZZ. Although not shown in FIG. 15, each protection path YY/ZZ may include a control plane tunnel and a corresponding data plane tunnel, as described above. Thus, in the span between nodes E and F, for example, a control plane tunnel YY and a data plane tunnel YY may be set up for protection path YY, and a control plane tunnel ZZ and a data plane tunnel ZZ may be set up for protection path ZZ. The data plane tunnels YY and ZZ may be deactivated. In other words, none of the nodes have established connections, through their data plane switching fabric, for data plane tunnels YY and ZZ.

To set up protection path YY, ingress node A may send one or more control messages to nodes E, F, and D. To set up protection path ZZ, ingress node G may send one or more control messages to nodes E, F, and I. The one or more control messages may include labels and information for setting up the respective control plane and data plane tunnels for the protection paths.

Nodes E and F may store the labels for the different protection paths in their look-up tables, along with data plane tunnel identifiers. Nodes A, D, G, and I may also include look-up tables that store labels, although this aspect is not shown in FIG. 15. As shown in FIG. 15, node E may include two entries: a first entry (corresponding to protection path YY) with the label "L10" in the ingress label portion, the label "L23" in the egress label portion, and the identifier "123" in the data plane tunnel identifier field; and a second entry (corresponding to protection path ZZ) with the label "L40" in the ingress label portion, the label "L56" in the egress label portion, and the identifier "123" in the data plane tunnel identifier field. As further shown in FIG. 15, node F may include two entries: a first entry (corresponding to protection path YY) with the label "L23" in the ingress label portion, the label "L31" in the egress label portion, and the identifier "123" in the data plane tunnel identifier field; and a second entry (corresponding to protection path ZZ) with the label "L56" in the ingress label portion, the label "L61" in the egress label portion, and the identifier "123" in the data plane tunnel identifier field.

As shown in FIG. 15, multiple protection paths (e.g., protection paths YY and ZZ) can share bandwidth on the link between nodes E and F. If a failure occurs on one of the working paths (e.g., one of working paths YY or ZZ), then the corresponding protection path (e.g., protection path YY or ZZ) may be activated using a technique similar to the techniques described above. In one implementation, only one protection path may be activated at any given time.

As described above, a particular portion of bandwidth on a link (e.g., on the link between nodes E and F) may be reserved, or dedicated, for protection (e.g., 30%). Multiple protection paths may share this portion of bandwidth. In the situation where working path failures occur which result in the need for the activation of more than one of these multiple protection paths, a priority scheme may be used to resolve the conflict. The priority scheme may be as simple as a random selection to a more complex scheme, such as a round robin scheme, a weighted round robin scheme, a scheme based on pre-assigned priority levels, or the like.

CONCLUSION

Implementations, described herein, may facilitate the switch-over from a working path to a protection path. As described above, both a control plane tunnel and a corresponding data plane tunnel may be set up for the protection path. Control messages may then be sent on the control plane tunnel to activate the data plane tunnel of the protection path. Decisions, relating to these control messages, may be made in hardware (as opposed to software running on a processor). As a result, fast (e.g., less than or equal to approximately 50 ms) switch-over from a failed working path to an active protection path may be achieved.

The foregoing description provides illustration and description, but is not intended to be exhaustive or to limit the invention to the precise form disclosed. Modifications and variations are possible in light of the above teachings or may be acquired from practice of the invention.

For example, it has been described that a control message has information for setting up both a control plane tunnel and a data plane tunnel. In another implementation, separate control messages may be used to set up the control plane tunnel and the data plane tunnel.

Further, it has been described that control messages may be sent through the control plane tunnel to change the state of a corresponding data plane tunnel. In another implementation, the control messages may also, or alternatively, be used to report the status of the corresponding data plane tunnel (e.g., whether the data plane tunnel is activated or deactivated) or to report the status of the control plane tunnel (e.g., whether the control plane tunnel is operational or has failed).

Also, certain portions of the implementations have been described as "components" that perform one or more functions. The term "component," as used herein, may include hardware, such as a processor, an ASIC, or a FPGA, or a combination of hardware and software. The term "hardware component," as used herein, may refer to a component that is implemented strictly in hardware, such as an ASIC or a FPGA.

Further, implementations have been described in the context of using labels for control messages to make decisions regarding activating/deactivating protection paths. These labels may also be used to make decisions regarding signal preemption.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed in a network that comprises a plurality of nodes, the method comprising:
    identifying a path through a set of nodes, of the plurality of nodes, in the network, where each node, in the set of nodes, has a data plane and a control plane;
    establishing a control plane tunnel, associated with the path, within the control plane of the nodes in the set of nodes; establishing a data plane tunnel, associated with the path, within the data plane of the nodes in the set of nodes, where the data plane tunnel is associated with the control plane tunnel and established through the same set of nodes;

transmitting a first control message through the control plane tunnel to change a state of the data plane tunnel;

receiving a second control message at said each node in the set of nodes; and making a copy of the second control message at said each node in the set of the nodes, where establishing the control plane tunnel and setting up the data plane tunnel include: sending a Generalized Multi-Protocol Label Switching (GMPLS) control message to said each node in the set of nodes, and a plurality of control plane labels and first information for setting up the control plane tunnel, and a plurality of data plane labels and second information for setting up the data plane tunnel, the plurality of control plane labels, the plurality of data plane labels, the first information, and the second information collectively being an extension of the GMPLS control message, and where said each node in the set of nodes stores the plurality of control plane labels, a label that corresponds to a next hop node of the set of nodes, and the plurality of data plane lables in a look-up table in a memory, the plurality of data plane labels being a data plane tunnel identifier, which is associated with the plurality of control plane labels in the look-up table, such that received second control message including a received control plane label is used by said each of the nodes to identify the plurality of control plane labels and the corresponding data plane tunnel identifier in the look-up table, wherein a state of the data plane tunnel is changed based on the data plane identifier in the look-up table.

2. The method of claim 1, where said each node in the set of nodes includes a data plane switching fabric; where the data plane tunnel is deactivated; and where changing the state of the data plane tunnel includes activating the data plane tunnel by establishing a connection, for the data plane tunnel, through the data plane switching fabric within the nodes in the set of nodes.

3. The method of claim 1, where said each node in the set of nodes includes a data plane switching fabric; where the data plane tunnel is activated; and where changing the state of the data plane tunnel includes deactivating the data plane tunnel by removing a connection, for the data plane tunnel, through the data plane switching fabric within the nodes in the set of nodes.

4. The method of claim 1, where transmitting the control message includes label switching the control message, through the control plane tunnel, based on the received control plane label.

5. The method of claim 1, further comprising: transmitting a message through the control plane tunnel to report a status of the data plane tunnel.

6. The method of claim 1, further comprising: transmitting a message through the control plane tunnel to report a status of the control plane tunnel.

7. A method performed in a network that comprises a plurality of nodes, the method comprising:

identifying a path through a set of nodes, of the plurality of nodes, in the network, where each node, in the set of nodes, has a data plane and a control plane, the data plane including a data plane switching fabric;

establishing a control plane tunnel, associated with the path, within the control plane of the nodes in the set of nodes;

setting up a data plane tunnel, associated with the path and within the data plane of the nodes in the set of nodes, without establishing a connection, for the data plane tunnel, through the data plane switching fabric within the nodes in the set of nodes; and activating the data plane tunnel, within the data plane of the nodes in the set of nodes, by transmitting a control message, through the control plane tunnel, to the nodes in the set of nodes, the control message including a label used by the nodes, in the set of nodes, to forward the control message through the control plane tunnel and to identify the data plane tunnel to activate, where activating the data plane tunnel includes establishing a connection, for the data plane tunnel, through the data plane switching fabric within the nodes in the set of nodes; and copy the control message at each of the nodes in the set of nodes, where establishing the control plane tunnel and setting up the data plane tunnel include: sending a Generalized Multi-Protocol Label Switching (GMPLS) control message to said each node in the set of nodes, where the GMPLS control message includes at least one control label and first information for setting up the control plane tunnel and at least one data label and second information for setting up the data plane tunnel, said at least one control plane label, said at least one data plane label, the first information, and the second information collectively being an extension of the GMPLS control message, and where said each node in the set of nodes stores said at least one control plane label, a label that corresponds to a next hop node of the set of nodes, and said at least one data plane label in a look-up table in memory, said at least one data plane label being a data plane tunnel identifier that is associated with said at least one control plane label in the look-up table.

8. The method of claim 7, where the path is a protection path that corresponds to a working path; where the method further comprises: establishing the working path through another set of nodes, of the plurality of nodes, in the network, where at least one node in the other set of nodes differs from any node in the set of nodes.

9. The method of claim 8, further comprising: detecting a failure on the working path, where activating the data plane tunnel is performed in response to detecting the failure on the working path.

10. The method of claim 7, where activating the data plane tunnel includes: receiving, by a particular node in the set of nodes, the control message, comparing, by the particular node, the label to a plurality of labels stored in a memory of the particular node, and activating, by the particular node, the data plane tunnel upon finding a match between the label and one of the plurality of labels stored in the memory.

11. The method of claim 10, where the control message includes an instruction to change a state of the data plane tunnel, and where activating the data plane tunnel includes activating, by the particular node, the data plane tunnel, based on the control message, when the data plane tunnel is deactivated.

12. The method of claim 10, further comprising: swapping another one of the plurality of labels stored in the memory for the label in the control message to form a modified control message; and forwarding the modified control message to another node in the set of nodes.

13. The method of claim 7, further comprising: setting up a plurality of data plane tunnels between a first node, in the set of nodes, and a second node, in the set of nodes, where the data plane tunnel is one of the plurality of data plane tunnels set up between the first node and the second node, and where activating the data plane tunnel includes:
    receiving, by the first node, the control message,
    selecting, by the first node, one of the plurality of data plane tunnels based on the label in the control message, and
    activating, by the first node, the selected one of the plurality of data plane tunnels.

14. A system, comprising:
    means for identifying a path through a set of nodes of a plurality of nodes in a network, where each node, in the set of nodes, has a data plane and a control plane, the data plane including a data plane switching fabric;
    means for establishing a control plane tunnel, associated with the path, within the control plane of the nodes in the set of nodes;
    means for establishing a data plane tunnel, associated with the path and within the data plane of the nodes in the set of nodes, by establishing a connection, for the data plane tunnel, through the data plane switching fabric within the nodes in the set of nodes;
    means for deactivating the data plane tunnel, within the data plane of the nodes in the set of nodes, by transmitting a control message, through the control plane tunnel, to instruct the nodes in the set of nodes to change a state of the data plane tunnel, where deactivating the data plane tunnel includes removing the connection, for the data plane tunnel, through the data plane switching fabric within the nodes in the set of nodes,
    where the means for establishing the control plane tunnel and the means for establishing the data plane tunnel include: means for sending a Generalized Multi-Protocol Label Switching (GMPLS) control message to said each node in the set of nodes, where the GMPLS control message includes at least a control plane label and first information for setting up the control plane tunnel, and at least a data plane label and second information for setting up the data plane tunnel, and where said each node in the set of nodes stores said at least one control plane label, a label that corresponds to a next hop node of the set of nodes, and said at least one data plane label in a look-up table in memory, the at least one data plane label being a data plane tunnel identifier that is associated with the at least one control plane label in the look-up table, the GMPLS control message being copied at said each node in the set of nodes, wherein said at least one control plane label, said at least one data plane label, the first information, and the second information collectively being an extension of the GMPLS control message.

15. The system of claim 14, where the path is a protection path associated with a working path; where the system further comprises:
    means for establishing the working path through another set of nodes, of the plurality of nodes, in the network, where at least one node in the other set of nodes differs from at least one node in the set of nodes.

16. The system of claim 14, further comprising:
    means for detecting a failure on the working path,
    where the means for deactivating the data plane tunnel deactivates the data plane tunnel in response to detecting the failure on the working path.

17. The system of claim 14, where the control message includes a label, and
    where the means for deactivating the data plane tunnel includes:
    means for receiving, by a particular node in the set of nodes, the control message,
    means for comparing, by the particular node, the label to a plurality of labels stored in a memory of the particular node, and
    means for deactivating, by the particular node, the data plane tunnel upon finding a match between the label and one of the plurality of labels stored in the memory.

18. The system of claim 17,
    where the control message includes an instruction to change a state of the data plane tunnel, and where the means for deactivating the data plane tunnel includes means for deactivating, by the particular node, the data plane tunnel, based on the control message, when the data plane tunnel is activated.

19. The system of claim 17, further comprising:
    means for swapping another one of the plurality of labels stored in the memory for the label in the control message to form a modified control message; and
    means for forwarding the modified control message to another node in the set of nodes.

20. The system of claim 14, further comprising:
    means for setting up a plurality of data plane tunnels between a first node, in the set of nodes, and a second node, in the set of nodes, where the data plane tunnel is one of the plurality of data plane tunnels set up between the first node and the second node, and
    where the means for deactivating the data plane tunnel includes:
    means for receiving, by the first node, the control message,
    means for selecting, by the first node, one of the plurality of data plane tunnels based on information in the control message, and
    means for deactivating, by the first node, the selected one of the plurality of data plane tunnels.

\* \* \* \* \*